United States Patent Office 3,069,462
Patented Dec. 18, 1962

3,069,462
OXIDATION OF AROMATIC COMPOUNDS
Alfred Saffer, Bayside, and Robert S. Barker, Port Washington, N.Y., assignors to Mid-Century Corporation, Chicago, Ill., a corporation of Delaware
No Drawing. Filed May 5, 1958, Ser. No. 732,789
6 Claims. (Cl. 260—524)

This invention relates to the catalytic liquid phase oxidation of aromatic compounds to aromatic carboxylic acids in the presence of a catalyst comprising bromine and a heavy metal oxidation catalyst and more specifically pertains to such a catalytic liquid phase oxidation process wherein the bromine in the catalyst system is provided by a form of combined or covalent bromine.

A highly efficient and novel catalytic liquid phase oxidation system for oxidizing aromatic compounds containing at least one and preferably a plurality of oxidizable aliphatic substituents and particularly dialkylbenzene and partially oxidized derivatives thereof to carboxylic compounds and particularly phthalic acids, utilizing a catalyst comprising in conjoint presence a heavy metal oxidation catalyst and a source of bromine, either elemental ionic or combined bromine is described in claim in copending application Serial No. 530,401, filed August 24, 1955, now U.S. Patent No. 2,833,816. In this copending application the use of combined or covalent forms of bromine such as bromine containing organic compounds which provide bromine or bromine ions under the conditions of the oxidation process as the source of bromine for the catalyst system is disclosed and claimed.

It has been found that under certain conditions of operation of the catalytic liquid phase oxidation the process of the above copending application employing a covalent or combined form of bromine as the source of bromine for the catalyst system, there is encountered a condition of slow oxygen consumption resulting in the formation of gaseous mixtures in the vapor space in the oxidation zone and in the exit gases from the oxidation zone having a high oxygen content above 6 to 8 percent by volume. Such mixtures contain vapors of the aromatic compound to be oxidized and/or vapors of the aliphatic monocarboxylic acids when such are present as the reaction medium. Since these catalytic liquid phase oxidations are carried out at elevated temperatures, above 200° F. and preferably 350 to 475° F., and at elevated pressures which provide a liquid phase in the oxidation zone, there is present during such conditions of high oxygen concentration the possibility of forming an explosive mixture. The conditions which provide the initial high oxygen concentration in such gaseous mixtures occur in general, when the source of oxygen is initially passed into the oxidation zone at a maximum gas flow rate, that is, the maximum gas input ratio which can be utilized without flooding the vapor space and/or condenser and exit gas lines, and the reaction mixture therein is at a temperature below that at which the combined or covalent form of bromine provides bromine or bromine ions, i.e., the reaction mixture is below the temperature at which bromine or bromine ions are liberated from the combined or covalent form of bromine. Such conditions can be avoided by employing as the source of bromine elemental or ionic forms of bromine. However, the use of covalent or combined forms of bromine, bromine containing organic compounds, has certain technological advantages because of the solubility of these forms of bromine in the reaction mixture or component thereof and because many of the bromine containing organic compounds are liquid and therefore can be readily metered into the reaction medium. Also, such conditions of high oxygen content obviously can be avoided by having the reaction mixture at a temperature at which the bromine containing compound decomposes or liberates bromine or bromine ions. Where such a low temperature condition occurs is generally during start up of a batch of continuous operation. To have the reactants at a higher initial temperature would require a greater input of heat to the initial reaction mixture prior to passing molecular oxygen into the oxidation zone. Obviously, this would require longer heat up, greater heat transfer in the oxidation reactor or larger preheater capacity when the reactions are preheated before charged to the oxidation zone to heat the reactants to such higher temperature. Also less of the heat of reaction could be used to bring the reaction mixture temperature up to the desired reaction temperature. Another means for avoiding the initial high oxygen concentration in the gaseous mixture would be to add the molecular oxygen in a dilute form or add the molecular oxygen slowly for the initial portion of the reaction. The disadvantages of such a procedure are obvious.

In addition to the disadvantages above noted, a slow initial reaction accompanies the condition of high oxygen content when present in the initial portion of the reaction. Also, when the high initial oxygen concentration condition occurs in industrial apparatus, the safety and control instruments would cause the cutting off of the source of molecular oxygen to the oxidation zones and thus would shut down the oxidation equipment. This, of course, would require repeating the start-up procedure.

The aforementioned solutions to the conditions of high initial oxygen concentration in the gaseous mixtures would tend to make the start up of industrial size reaction equipment more complex and add immeasurably to the cost of carrying out the process.

The oxidation reaction is exothermic and a substantial reduction in preheat or cost, time and apparatus size can be realized when the heat of reaction is utilized to bring the reaction mixture up to the desired reaction temperature. To utilize this technological advantage and the other technological advantages before pointed out as being provided by the use of covalent or combined forms of bromine, it is highly desirable to overcome the disadvantages of the initial high concentration in the gaseous mixtures.

It has now been discovered that the disadvantages hereinbefore pointed out can be eliminated and the technological advantages associated with the catalytic liquid phase oxidation process which employs a catalyst system containing a heavy metal oxidation catalyst and bromine provided by a covalent or combined form of bromine can be fully attained by adding to the reaction mixture containing the aromatic compound to be oxidized the covalent form of bromine and the heavy metal oxidation catalyst, before or after preheating, a bromine compound which readily provides ionic bromine in addition to the combined or covalent form of bromine. Such a bromine compound which readily provides ionic bromine is elemental bromine or a bromine containing compound which provides bromine or bromine ion under ordinary conditions. For example, bromine compounds which ionize readily in aqueous solutions thereof or when dissolved in acetic acid at room temperature or which give up bromine or bromine ions at ordinary temperatures of from 50° to 200° F. In the process of this invention, the amount of such an ionic bromine providing material to be added is less than about 50% by weight based on the covalent or combined form of bromine. Desirably the amount of readily ionizable form of bromine to be added is within the range of 10 to 50% by weight and preferably 20 to 40% by weight based on the combined or covalent form of bromine. It will be appreciated that such amounts are quite small in view of the fact that the amount of combined or covalent form of bromine employed is generally not greater than 10% by weight based upon the aromatic hydrocarbons to be oxidized and will generally be in the range of 0.5 to about 3% by weight.

Also associated with this invention is the desirability to coordinate the use of the heavy metal oxidation catalyst with the total bromine utilized. In copending application Serial No. 530,401, now U.S. Patent No. 2,833,816, the use of from 1 to 7 atoms of metal for each atom of bromine or from 1 to 10 atoms of bromine per atom of metal is disclosed and claimed. Within these ranges, there is a particular ratio of metal and bromine which provide maximum rate of oxidation utilization of oxygen and product yield. The foregoing and other advantages can be obtained when the ratio of atomic weight of metal to total bromine (sum of bromine from all forms) is in the atomic weight ratio range of desirably from about 0.70 to 1.50 atomic weight of metal and preferably of from 0.9 to 1.20 atomic weight of metal per atomic weight of bromine.

Now, when the reaction mixture containing the aromatic compound to be oxidized, a heavy metal oxidation catalyst and both forms of bromine with the metal to bromine in the aforementioned ratios and with or without an inert reaction medium is heated to the minimum temperature at which the oxidation reaction will be self-sustaining, the source of molecular oxygen can be passed into the reaction mixture in the oxidation zone at a maximum rate and the consumption of oxygen will be substantially complete or at most will provide only a small amount of free oxygen in the vapors from the reaction zone. By a small amount of free oxygen is meant an oxygen concentration in the vapors below that providing an explosive or flammable mixture and will generally be in the range of from about 0.1% to about 5% by volume. The flammable or explosive range of oxygen concentration begins at about 8% by volume and will vary somewhat to about 20%, depending upon the mixture of the materials in the gaseous mixture.

More specifically, the problem of oxygen breakthrough occurring in the catalytic liquid phase oxidation of aromatic compounds in the presence of a heavy metal oxidation catalyst and bromine added initially as combined bromine is illustrated by the following:

*Example 1*

A mixture containing about 75 grams para-xylene, 150 grams glacial acetic acid, 0.2 gram cobalt acetate tetrahydrate, 0.4 gram manganese acetate tetrahydrate and 0.2 gram tetrabromoethane are charged to an oxidation reactor. This reactor comprises a vertical tubular reactor with an external heater and air inlet at the bottom of the reactor, a water cooled vertical condenser mounted on top of the reactor, a gas exit line at the top of the condenser, a pressure control valve in the exit gas line and a gas flow meter and an oxygen analyzer in the exit gas line following the control valve. The reactor is pressurized with nitrogen to about 300 p.s.i.g. and the reaction mixture is heated to 385° F. with nitrogen flowing through the reaction mixture and exiting from the reactor at about 0.07 cubic foot per minute. When the reaction mixture is at a temperature of 385° F. the nitrogen is shut off, the pressure control valve adjusted and air is fed into the reactor at a maximum air flow rate (about 0.231 cubic foot per minute). When all the nitrogen is swept from the reaction vessel, the oxygen content of the exit gas immediately rises to about 10% by volume although dropping to about 0.7 to 1.0% by volume within about 5 minutes. Thereafter the oxygen content of the exit gas remains low, not exceeding about 2 to 4% until the reaction is substantially complete.

When the foregoing process is repeated except that the reactants are heated to a temperature of from about 350° to 360° F. before air is added to the oxidation zone, the oxygen breakthrough or high oxygen content of the exit gas persists for a longer period of time. However, when the source of bromine initially is entirely an ionic form of bromine such as ammonium bromide, the oxygen content of the exit gas immediately after sweeping nitrogen from the oxidation zone rises to about 0.5 to 1.0% by volume and substantially immediately thereafter drops to about 0 to 0.2% by volume in either of these processes.

*Example 2*

The process of Example 1 is repeated except a portion of the tetrabromoethane is replaced by ammonium bromide to the extent that 25% of the total bromine is provided by this ionic form of bromine. When the reactants are at 385° F. and air is added at the maximum rate the oxygen content of the exit gas rises only to about 3.5% by volume and substantially immediately thereafter drops to about 1.7% by volume.

*Example 3*

The process of Example 1 is repeated except that 50% of the total bromine charged is in the form of ionic bromine. When the reactants are 385° F. and air is added at the maximum rate, the oxygen content of the exit gas rises only to about 1.3% by volume and substantially immediately thereafter drops to 0.4%.

*Example 4*

The process of Example 2 is repeated except that 20% of the total bromine is supplied by hydrogn bromide. The oxygen content of the exit gas will not rise beyond about 4 to 5% by volume after the air is added and, substantially immediately thereafter drops to about 1.5 to 1.0%.

*Example 5*

The process of Example 2 is repeated except that 40% of the total bromine is supplied by sodium bromide. The oxygen content of the exit gas will not rise beyond about 2 to 4% by volume after air is added and substantially immediately thereafter drops to about 1.0% by volume.

It has been found that the initial breakthrough of oxygen can be prevented from rising above about 6 to 8% by volume by initially charging an ionic form of bromine in an amount of above about 10% but less than 50% of the total bromine present. However, the initial breakthrough oxygen content of the exit gases can be kept below about 4% by volume by providing from about 20% to about 40% of the total amount of bromine as an ionic form of bromine. More than 50% of the total amount of bromine provided by an ionic form of bromine does not appear to provide any improved results. That is, when 50% bromine is provided by the ionic form, the oxygen breakthrough concentration is at a minimum of about 1% by volume.

Results comparable to the above are obtained in the oxidation of other aliphatic substituted aromatic compounds and their oxygenated derivatives with molecular oxygen in the catalytic liquid phase oxidation system, for it is not the aromatic compound being oxidized which effects the liberation of the ionic bromine from the combined covalent form of bromine, but, as hereinbefore stated, it is rather the conditions of temperature, addition of source of molecular oxygen and the covalent or combined form of bromine which create the problem of oxygen breakthrough. Thus, the benefits of the process of this invention can be obtained when aromatic compounds containing such oxidizable groups as the aliphatic groups or partially oxidized aliphatic groups, such as alcohols, aldehydes, ketones, peroxide type compounds, and the like are the feed stock to be oxidized to the corresponding aromatic carboxylic acids. The process of this invention is applicable to the preparation of aromatic mono, di and higher polycarboxylic acids including such acids which contain inert nuclear substituents. The process of this invention is an improvement over the process of copending application Serial No. 530,401, filed August 24, 1955, now U.S. Patent No. 2,838,816, and therefore, is applicable to the oxidation of the classes of compounds therein disclosed and the preparation of the corresponding aromatic carboxylic acids. Said compounds are members of the group consisting of alkyl aromatic compounds and intermediate oxygenated derivatives thereof. The process of this invention is applicable to the use of combined or covalent forms of bromine in addition to tetrabromoethane which do not liberate ionic bromine at temperatures below about 400° F. and especially those which do not liberate ionic bromine at 250° F. to 400° F.

As a source of bromine for readily ionizable bromine compounds, there may be employed for the purposes of this invention such compounds as ammonium bromide, alkali metal bromides, hydrogen bromide, alkali metal bromates, and elemental bromine among others.

What is claimed is:

1. In a process for producing an aromatic carboxylic acid by reacting in a reaction zone, while maintaining a liquid phase in said zone, an aromatic compound selected from the group consisting of alkyl aromatic compounds and intermediate oxygenated derivatives thereof with molecular oxygen in the presence of a catalyst comprising in conjoint presence bromine and a heavy metal oxidation catalyst wherein a covalent form of bromine is employed as the principal source of bromine for said catalyst and wherein said process bromine is not liberated from said covalent form of bromine at reaction initiation temperature in the range of 200° to 400° F. to promote sufficient oxidation to prevent the formation of gaseous mixtures containing more than 8 percent oxygen by volume from issuing from said zone, the improvement for said catalyst for said reaction initiated at a temperature in the range of 200° to 400° F. consisting essentially: adding to the mixture in said zone an ionic form of bromine in an amount in the range of from 10 up to 50% by weight of the covalent form of bromine in said catalyst thereby preventing during reaction initiation formation of said gaseous mixtures containing more than 8 percent oxygen by volume.

2. In a process for producing terephthalic acid by reacting in a reaction zone, while maintaining a liquid phase in said zone, paraxylene with molecular oxygen in the presence of a catalyst comprising tetrabromoethane and a mixture of cobalt and manganese acetates and wherein said process bromine is not liberated from tetrabromoethane at reaction initiation temperature in the range of 200° F. to 385° F. to promote sufficient oxidation to prevent the formation of gaseous mixtures containing more than 8 percent oxygen by volume from issuing from said zone, the improvement for said catalyst for said reaction initiated at a temperature in the range of 200° F. to 385° F. consisting essentially: adding to the mixture in said zone an ionic form of bromine in an amount in the range of from 20 up to 40% by weight of tetrabromoethane in said catalyst thereby preventing during reaction initiation formation of said gaseous mixtures containing more than 8 percent oxygen by volume.

3. The process of claim 2 wherein the added ionic bromine compound is ammonium bromide.

4. The process of claim 2 wherein the added ionic bromine compound is hydrogen bromide.

5. The process of claim 2 wherein the added ionic bromine compound is alkali bromide.

6. The process of claim 2 wherein the added ionic bromine compound is sodium bromide.

References Cited in the file of this patent

UNITED STATES PATENTS

| | | |
|---|---|---|
| 2,444,924 | Farkas et al. | July 13, 1948 |
| 2,833,816 | Saffer et al. | May 6, 1958 |